United States Patent [19]

Parodi et al.

[11] Patent Number: 5,145,880
[45] Date of Patent: Sep. 8, 1992

[54] LIQUID, REACTIVE COMPOSITIONS ENDOWED WITH HIGH POLYMERIZATION SPEED, CONTAINING POLYISOCYANATES AND COMPOUNDS WITH ONE OR MORE EPOXY GROUPS

[75] Inventors: Fabrizio Parodi, Genoa; Carlo Belgiovine, Quiliano, both of Italy

[73] Assignee: Enichem S.p.A., Milan, Italy

[21] Appl. No.: 685,455

[22] Filed: Apr. 12, 1991

[30] Foreign Application Priority Data

Apr. 24, 1990 [IT] Italy ................ 20125 A/90

[51] Int. Cl.$^5$ ............................. C08G 18/14
[52] U.S. Cl. .................... 521/115; 528/52; 549/512; 549/513
[58] Field of Search .............. 521/115; 528/52; 549/512, 513

[56] References Cited

FOREIGN PATENT DOCUMENTS 0010805 5/1980 European Pat. Off. .
0129800 1/1985 European Pat. Off. .
0272563 6/1988 European Pat. Off. .

Primary Examiner—Maurice J. Welsh
Attorney, Agent, or Firm—Shea & Gould

[57] ABSTRACT

A reactive composition, rapidly polymerizable already starting from room temperature, comprises a liquid mixture consituted by at least one organic polyisocyanate, at least one compound containing one or more epoxy groups and a liquid catalyst constituted by, or containing, at least one compound falling within the scope of the general formula

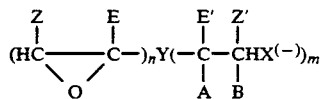

in which the substituents have the meanings reported in the following; the compound which contains the epoxy group(s) can be constituted by the catalyst only.

Such a composition can turn into a polymeric material having softening temperatures as high as 300° C. and even higher.

15 Claims, No Drawings

LIQUID, REACTIVE COMPOSITIONS ENDOWED WITH HIGH POLYMERIZATION SPEED, CONTAINING POLYISOCYANATES AND COMPOUNDS WITH ONE OR MORE EPOXY GROUPS

The present invention relates to a liquid reactive composition capable of rapidly polymerising already starting from room temperature, or anyway from temperatures not higher than 60° C., and of turning into a solid, insoluble polymeric material with a very high softening temperature. Such a composition is destined to be used, either in its pristine state or in association with reinforcer fibres, or also with mineral fillers or still other additives, for rapidly manufacturing finished fabricated articles, semifinished articles, surface coatings, bonding agents or sealants, with a high, or very high, heat distorsion temperature.

The reactive composition according to the present invention basically comprises a liquid mixture consisting of organic polyisocyanates, poly- and/or monoepoxides, optional additives and/or auxiliary agents, such as mineral fillers, as well as of a suitable liquid catalyst, easily manageable and rapidly soluble in the same mixture, and which promotes the polymerization of the whole composition already at room temperature, or at a slightly higher temperature; such a catalyst is also capable of taking part in the whole polymerization process.

In the sector of the thermosetting resins, it is known that polymeric products containing chemical structures constituted by isocyanurate moeieties, obtainable by means of the polymerization of polyisocyanates, as well as polymeric products containing 2-oxazolidone structures, or jointly containing isocyanurate and 2-oxazolidone moieties, which can be obtained in their turn by means of the polymerization of mixtures of polyisocyanates with monoepoxides or polyepoxides, result to be of industrial interest thanks to their heat stability, to their hydrolysis resistance and to the high values of glass transition temperature which the presence of said isocyanurate and 2-oxazolidone structures gives them.

Therefore, such a kind of polymeric products can find useful applications for the manufacture of fabricated articles, for producing surface coatings, or still for producing bonding agents or sealants, for which a good chemical stability at high temperature and/or in hydrolytically aggressive mediums, as well as a high value of softening temperature and reduced deformation under stress at high temperature are required.

It is known as well that the polymerization of liquid mixtures of diisocyanates or polyisocyanates and mono- or poly-epoxides can be promoted by means of the use of tertiary amines, of quaternary ammonium salts, or of tetraalkyl-phosphonium halides: reference is made, e.g., to German patents 3,323,084; 3,323,122; 3,323,123; 3,323,153; 3,600,767; or also U.S. Pat. Nos. 3,687,897 and 4,742,142 as well.

According to such, and still further, patents, the polymerization of mixtures comprising polyisocyanates, polyepoxides and a suitable catalyst is accomplished, with their consequent gelling and hardening, by heating such mixtures at temperatures comprised within the range of from 60° to 150° C. and, preferably, comprised within the range of from 80° to 130° C.

The polymerization is then completed by maintaining the by now solidified material at temperatures higher than 150° C.

However, the compositions known from the prior art and therefore the fabricated articles which can be obtained from them are not free from some drawbacks, particularly as regards the catalytic systems used. Among such drawbacks, reminding the following will suffice:

rapid polymerizations are only possible at considerably high temperatures or in the presence of high catalyst concentrations;

the catalysts mentioned do not react, and therefore remain in a free state inside the end polymeric material. They can hence easily migrate within the same material, with easy extractions by solvents, water or different cleaning solutions being consequently possible;

the tertiary amines can be inactivated by the contact with air;

difficulties can be found in the dissolution of the quaternary ammonium or phosphonium salts cited in pertinent technical literature and/or claimed—which are known to be solid compounds melting at even high temperatures and in general poorly soluble in organic solvents and resins.

It is furthermore well-known that, in relation with the methods of manufacture of the fabricated articles from polymeric materials deriving from the polymerization of thermosetting resins, and, above all, from composite materials obtainable by means of the polymerization of thermosetting resins in which reinforcer fibres and/or mineral powders are distributed or dispersed, considerably interesting is the possibility of being capable of practically carrying out processes which are based on the rapid, forced mixing of liquid reactants, catalysts and possibly various kinds of additives, injection or suction of the resulting liquid reactive composition into a closed mould containing, or not containing, variously shaped or variously arranged reinforcer fibres, quick gelling and solidification of the composition inside the mould, and then rapid extraction of the solid manufactured article from the same mould.

Such a type of processes are known to those skilled on the art and for exemplifying purposes those can be cited which are identified on the international market by the Anglo-Saxon names of "Resin Transfer Moulding", "High Speed Resin Transfer Moulding", "Resin injection Moulding", "Liquid Injection Moulding", "Reaction Injection Moulding", and the like; for exemplifying purposes, reference is made here to the following paper: "Resin Transfer Moulding of Aerospace Resins—A Review", by F. C. Robertson, British Polymer Journal, 20, pages from 417 to 429 (1988).

Processes of the above indicated type make it possible fast, automated and cheap processes to be used in order to manufacture finished articles of also considerable dimensions, with a good control of the dimensions, of the thicknesses and of the general structure of the same finished articles, thanks to the constraints represented by the precise and fixed dimensions of the hollows of the fabrication moulds, and of the nature, amount and geometric arrangement—all parameters which can be exactly and reproducibly predetermined—of the resins, fibres and/or mineral additives charged to the same moulds.

The suitable thermosetting resins for such processes should be characterized by total times of gelling and hardening which are very short, and anyway are of the order of the minutes, or at maximum of some tens of minutes, in order to make it possible the solidified fabricated articles to rapidly reach their state of safe manageability; which, in its turn, will make it possible said fabricated articles to be rapidly discharged from the fabrication moulds: a short time of occupancy of the moulds will be hence achieved, and within a short time the moulds will be ready to be used again for a successive moulding operation.

In fact, the chemical process of polymerization of the material already rapidly solidified inside the mould can be separately completed at high temperature, after the fabricated article being extracted from the same mould.

The chemical processes of gelling and hardening can be accelerated by strongly heating the thermosetting resin, or adding high concentrations of catalysts to the polymerization mixtures or, better, using very active catalysts.

An important limitation in the use of the fast manufacturing processes of the above described type is caused by the well-known exothermic character, typical of the polymerization processes of thermosetting resins in general. A strong heating of the resin, carried out in order to suitably accelerate the gelling and the hardening thereof, followed by the further temperature increase caused by the development of exothermic heat typical of the chemical polymerization process, tends to cause a strong overheating of the material, with possibility of thermal degradations of the same polymeric material, of the additives contained in it, such as, e.g., mould release agents or dispersing agents, of inserts possibly encapsuled inside it, up to components of the material being converted into gas substances, with foams or hollows being consequently formed. Furthermore, controlling the overheating is particularly difficult, in that the reaction heat is difficultly removed from the outside owing to the rapidity of the chemical process, and therefore of same reaction heat development.

Similar considerations are valid for reactive compositions capable of turning into polymeric products through fast polymerization processes, and which are suitable for manufacturing fabricated articles by means of processes of casting inside open moulds, or of distribution on shaped cores, in order to produce surface coatings, or as bonding agents or sealants, in particular in case high thicknesses thereof are applied. Also in these cases, the application of high temperatures, such as to cause the material to rapidly gelify and harden, or a long-time heating before the material is solidified, or also an overheating deriving from the exothermal character of the chemical polymerization process, can cause the same polymeric material, the additives contained in it, the bodies or surfaces into contact with it to undergo a thermal degradation, or also to cause, in particular when the material is still in the liquid or plastic state, and in case surfaces thereof are freely exposed to air, emissions of flammable, toxic or anyway noxious vapours of chemical compounds into the atmosphere of the working premises.

The present Applicant has found now that reactive composition capable of turning into polymeric products within short times, and suitable, without any of the above mentioned drawbacks, for manufacturing fabricated articles by means of processes of injection into, or casting in moulds, of distribution on shaped cores, for producing surface coatings, or for use as bonding agents or sealants.

In fact, the subject-matter of the present invention is a reactive composition capable of turning into a solid, polymeric, rigid, insoluble material having a softening temperature comprised within the range of from about 200° C. to about 300° C. by means of a fast chemical polymerization process, which enables the reactive composition according to the present invention to spontaneously and rapidly gel already starting from room temperature, or from a slightly higher-than-room temperature, and which can be then brought to its end by means of a proper and relatively short stay time at a high temperature. The catalyst which is among the constituents of the composition according to the present invention is furthermore characterized in that it is capable of taking part in the whole chemical polymerization process.

The reactive composition according to the present invention, optionally comprising mineral fillers and/or further additives and auxiliary substances known from the prior art, is therefore suitable for being used, both in the absence of, and in association with, reinforcer fibres or also non-fibrous reinforcer structures, for fast production of finished fabricated articles, semifinished articles, surface coatings, polymeric bonding agents or sealants having a very high heat distorsion temperature, with an excessive heating of the same polymeric material, of the bodies or surfaces into contact with and/or of the additives and auxiliaries contained in it, being prevented during their fabrication process.

Therefore, the reactive composition according to the present invention comprises:

(A) an organic polyisocyanate, preferably liquid at a temperature lower than 20° C., or a mixture, also preferably liquid at a temperature lower than 20° C., or different polyisocyanates (B) a mono- or poly-epoxide preferably liquid at a temperature comprised within the range of from 0° to 60° C., or a mixture, preferably liquid at a temperature comprised within the above said range, of different mono- and/or polyepoxides;

(C) at least one catalyst, liquid at a temperature lower than 60° C., and preferably lower than 20° C., as well as perfectly soluble and easily dissolvable, at a temperature lower than 60° C., in the above stated (A) or (B) components, or in both of them, or in mixtures thereof; the (B) mono- or polyepoxide can also be absent, in which case the presence of epoxy groups is secured by the same catalyst;

with the composition also comprising (D) mineral fillers, short or ground fibres, pigments, diluents, stabilizers, flame-retardant agents, agents endowing the composition with a thixotropic behaviour, lubricants, mould-release agents, antifoaming agents, propellants, blowing agents, surfactants, wetting agents and further possible additives or auxiliaries known from the prior art, or associations thereof.

According to the present invention, the (A) and (B) components from those as above listed are mixible with one another in suitable mutual ratios and preferably in all mutual ratios, and such (A)/(B) mixtures are liquids, and preferably have low viscosity values at a temperature lower than 60° C., and are stable, in the absence of the (C) catalyst, for a relatively long time at temperatures both higher and lower than 60° C.

Organic polyisocyanates suitable for being used according to the present invention are those which belong to the family of the compounds having the general formula $$X(NCO)_n,$$

wherein:

n is a numeral higher than 1 and preferably comprised within the range of from 2 to 3, and X is an n-valent, and preferably bivalent or trivalent organic radical containing from 6 to 24 carbon atoms of aliphatic, cycloaliphatic, aromatic, heterocyclic or mixed character.

A large number of such a kind of diisocyanates are reported, e.g., in the paper: "Diisocyanates" by A. A. R. Sayigh, H. Ulrich and W. J. Farissey Jr., on "Condensation Monomers", J. K. Stille and T. W. Campbell Editors, published by Wiley-Interscience, New York, 1972, pages 369–476. The "X" organic radical as above specified can also comprise heteroatoms not belonging to cyclic structures and/or several functional or bonding moieties, either containing or not containing heteroatoms, such as ether groups, thioether groups, ester groups, carbonyl groups, sulfonyl groups, amide groups, carbodiimide groups, urethane groups, allophanate groups, biuret groups, olefinic double bonds, acetylenic triple bonds and still others.

According to the present invention, polyisocyanates liquid at a temperature lower than 60° C., and preferably liquid at a temperature lower than 20° C. are used. Mixtures of different polyisocyanates can be advantageously used as well and, among these, those mixtures which are liquid at temperatures lower than 60° C. or, still better, liquid at temperatures lower than 20° C., are preferred.

According to the present invention, polyisocyanates are preferably used, which are selected from among the group consisting of the aromatic polyisocyanates, and of their mixtures. Said polyisocyanates and their mixtures include toluene-2,4-diisocyanate and toluene-2,6-diisocyanate and their mixtures, diphenylmethane-4,4'-diisocyanate, diphenylmethane-2,4'-diisocyanate, diphenylmethane-2,2'-diisocyanate and their mixtures, naphthalene-1,5-diisocyanate, 1,4-phenylene-diisocyanate, 3,3'-dimethyldiphenyl-4,4'-diisocyanate, diphenylether-4,4'-diisocyanate and triphenylmethane-4,4',4"-triisocyanate.

Other aromatic polyisocyanates which can be advantageously used are those polyphenylmethylene-polyisocyanates which can be obtained by means of phosgene reaction with aniline-formaldehyde condensation products.

Modified aromatic polyisocyanates which can be advantageously used according to the present invention are the isocyanate adducts which can be obtained by means of the reaction of a polyol containing m hydroxy groups with n.m moles of an aromatic polyisocyanate of the above cited type with n isocyanate groups and, in particular, with 2.0 m moles of an aromatic diisocyanate, preferably selected from among the above cited aromatic diisocyanates or mixtures thereof.

Useable polyols are, e.g., ethylene glycol, diethyleneglycol, triethyleneglycol, tetraethyleneglycol, propylene glycol, dipropyleneglycol, tripropyleneglycol, 1,3-butanediol and 1,4-butanediol, 1,5-pentanediol, 1,6-hexanediol, trimethyl-1,6-hexanediols, glycerol, 1,1,1-trimethylolpropane, 1,1,1-trimethylolethane and their mixtures.

The isocyanate adducts, or mixtures of different isocyanate adducts of the above indicated type, or mixtures of such adducts with aromatic polyisocyanates of the above indicated type, which are liquid at temperatures lower than 60° C., or, still better, at temperatures lower than 20° C., are preferably used. Examples of such isocyanate adducts which can be advantageously used are those adducts which are liquid at room temperature, of aromatic isocyanates which are solid at room temperature, such as those adducts which can be obtained by means of the reaction of diphenylmethane-4,4'-diisocyanate with dipropyleneglycol or triethyleneglycol.

Further aromatic polyisocyanates which can be advantageously used are the isocyanate prepolymers which can be obtained by means of the reaction of an aromatic polyisocyanate selected from among those as hereinabove listed, or of a mixtures of several of such polyisocyanates with a polymeric polyol having an average molecular weight preferably comprised within the range of from 200 to 15,000. Such isocyanate prepolymers can be obtained by reacting such amounts of aromatic polyisocyanate and of said polyol, that the molar ratio of the isocyanate group to the alcoholic hydroxy group is of 2, or higher than 2. Suitable polymeric polyols are polyalkyleneetherdiols, such as, e.g., polyethyleneglycol, polypropyleneglycol, polytetramethyleneglycol, polyhexamethyleneglycol and the corresponding mixed polyalkyleneetherdiols.

Further polymeric diols suitable for the process according to the present invention are those which can be obtained by means of the mono- or poly-oxyalkylenation of different, non-polymeric polyols with such alkylene oxides as ethylene oxide, propylene oxide, tetrahydrofuran, isobutylene oxide or mixtures thereof. Examples of such polymeric polyols are polypropoxylated 1,1,1-trimethylolpropane, mono- or polypropoxylated glycerol, polypropoxylated sorbitol, polypropoxylated pentaerythritol. Other useable polymeric polyols are the polyesters containing 2 or more alcoholic hydroxy groups at the ends of their molecules and an average molecular weight preferably comprised within the range of from 400 to 10,000; such as, e.g., those which can be obtained by means of polycondensation of a polycarboxy acid or of a mixture of different polycarboxy acids, and preferably bicarboxy acids, with a polyol or a mixture of different polyols and preferably diols, such that the ratio of the equivalents of the alcoholic hydroxy groups to the equivalents of carboxy groups is higher than 1.

Polyhydroxy-functional polyesters suitable according to the present invention are also those which can be advantageously obtained from suitable mixture of polyols and carboxy hydroxyacids, or also from mixtures of polyols, carboxy hydroxyacids and polycarboxy acids, and preferably those which can be obtained from diols, monohydroxy-monocarboxy acids and bicarboxy acids.

Further analogous polyols are the polyhydroxy-functional polyesters, and preferably polyesterdiols and polyestertriols, obtainable by means of the polymerization of lactones such as, e.g., ε-butyrolactone, ε-caprolactone or still others, or their mixtures, which polymerization is initiated by a suitable amount of a non-polymeric polyol, and preferably a diol or triol.

Still further polymeric polyols suitable for preparing isocyanate prepolymers comprise other polymers generally containing 2 or more alcoholic hydroxy groups, such as, e.g., polybutadienes or polyisoprenes or butadiene and isoprene copolymers containing endcapping and/or side alcoholic hydroxy groups, as well as polymers which can be obtained by means of the copolymerization of vinylic compounds, such as acrylonitrile, vinyl chloride, styrene and still others either alone or in mixture with one another, with at least one vinylic compound containing an alcoholic hydroxy groups, such as a hydroxyalkyl acrylate or methacrylate, a hydroxyalkyl-styrene, and still others.

According to the present invention, the use is generally preferable of commercial aromatic polyisocyanates, commonly available from the market, easy to be obtained and liquid at temperatures not higher than 40° C. Isocyanates of this type are, e.g., toluene-2,4-diisocyante and toluene-2,6-diisocyanate and the mixtures of these isomers and among them, in particular, the mixture of both of said 2,4- and 2,6-isomers, in the mutual ratio of 80:20, which is commonly offered on the market, diphenylmethane-4,4'-diisocyanate ("MDI") and the mixtures thereof with the corresponding diphenylmethane-2,4'-diisocyanate and diphenylmethane-2,2'-diisocyanate isomers. Commercial aromatic polyisocyanates of the above stated type and the use of which is particularly advantageos according to the instant finding are as well those products which can be obtained by means of the phosgenation of the aromatic polyamines deriving from the condensation of aniline and formaldehyde in different mutual ratios and obtained according to different condensation processes.

The isocyanates which can be obtained in this way, and are commonly identified as "crude" MDI, are constituted by more or less complex mixtures which prevailingly comprise diphenylmethane-4,4'-diisocyanate and diphenylmethane-2,4'-diisocyanate, together with further isomers thereof, and various polyphenylmethylene-polyisocyanates in variable ratios to each other. Said type of mixtures can additionally comprise isocyanates containing carbodiimide groups deriving from reactions of condensation of said isocyanates with one another, as well as/or isocyanate adducts obtained from said carbodiimide compounds and same isocyanates.

Other polyisocyanates which can be used with particular advantages are also the various mixtures of diphenylmethane-2,4'-diisocyanate and diphenylmethane-4,4'-diisocyanate which can be obtained by means of the distillation of the above cited phosgenation products, as well as the same residues from the same distillation, particularly rich of polyphenylmethylene-polyisocyanates.

Furthermore those distillation residues can be used, which are constituted by complex mixtures of compounds containing isocyanate groups, which can be recovered from the preparation of the commercial, aromatic diisocyanates and polyisocyanates in general, and different from the above listed polyisocyanates belonging to diphenylmethane family, such as, e.g., the residues from the distillation of toluene-diisocyanate and of further aromatic polyisocyanates from among the above mentioned group.

The (B) component of the reactive composition according to the present invention is constituted by a suitable monoepoxide and preferably polyepoxide, or by a mixture of various and suitable mono-and/or polyepoxides. Said suitable epoxides are organic compounds belonging to the families of aliphatic, cycloaliphatic, aromatic, heterocyclic or mixed-structure compounds whose molecules are endcapped with epoxy groups in a number equal to, or higher than, 1, and preferably equal to, or higher than, 2. A large number of diepoxides and polyepoxides of said type are reported, e.g., in the following literature references:

(a) "Handbook of Epoxy Resins", by H. Lee and K. Neville, MaGraw-Hill, New York, 1967 (or anastatic reprint of 1982), pages from 4–36 to 4–70;

(b) "Epoxy resins. New Results and Developments", by F. Lohse, Die makromolekulare Chemie, Macromolecular Symposia, Vol. 7, pages from 1 to 16 (1987).

The diepoxides and polyepoxides which can be used according to the present invention include the polyglycidylethers of bisphenols and of polyvalent phenols, such as 2,2-bis-(4-hydrophenyl)-propane (or bisphenol-A), 4,4'-dihydroxydiphenylmethane (or bisphenol F) and its isomers, 4,4'-dihydroxydiphenylether, 4,4'-dihydroxydiphenylsulfone (or bisphenol S), hydroquinone and hydroquinones containing various substituents on their benzene ring, resorcinol, pyrocatechol, phloroglucinol, methylphloroglucinol, 1,1,3-tris-(4-hydroxyphenyl)-propane, tris-(4-hydroxyphenyl)-methane, 2,2',4,4'-tetrahydroxydiphenyl, chlorinated or brominated bisphenols, such as 2,2-bis-(4-hydroxy-3,5-dichlorophenyl)-propane (also said "tetrachlorobisphenol A"), and 2,2-bis-(4-hydroxy-3,5-dibromophenyl)-propane (also said "tetrabromobisphenol A"), as well as the polyglycidylethers of novolaks, which can be obtained by polycondensation, in particular acid-catalysed polycondensation, of phenols and aldehydes, such as phenol-formaldehyde and orthocresol-formaldehyde novolaks.

Further polyepoxides which can be used comprise the polyglycidylesters of polycarboxy aliphatic, cycloaliphatic, aromatic and mixed-structure acids, such as adipic acid, dimer and trimer linoleic acid, hexahydrophthalic acid, methyl-hexahydrophthalic acid, 1,4-cyclohexanedioic acid, phthalic acid, isophthalic acid, as well as the polyglycidylesters of polycarboxy acids which can be obtained by means of the reaction of 1 mol of a polyol containing n hydroxy groups with n mol of a cycloaliphatic or aromatic anhydride, such as, e.g., those deriving from one mol of 1,4-cyclohexanediol and 2 moles of hexahydrophthalic anhydride, from 1 mol of 1,1,1-trimethylolpropane and 3 moles of hexahydrophthalic anhydride, from 1 mol of pentaerythritol and 4 moles of hexahydrophthalic anhydride, as well as, still, the polyglycidyl-(ether-esters) of carboxy hydroxyacids, such as 4,4-bis-(4-hydroxyphenyl)-valerianic acid.

Also useable are those polyepoxides which can be obtained by means of the N-alkylation of aromatic amines, or N-alkylation and etherification of aminophenols, with epichlorohydrin.

Such a type of polyepoxides comprise N,N-diglycidylaniline, N,N,N',N'-tetraglycidyl-4,4'-diaminodiphenylmethane, N,N,N',N'-tetraglycidyl-4,4'-diaminodiphenylsulfone, N,N-diglycidyl-4-glycidoxyaniline.

Furthermore, N-glycidylamides can be used, such as, e.g., N,N'-diglycidyloxyamide and several polyepoxides containing heterocyclic structures, such as triglycidylisocyanurate, 1,2,4-triglycidyl-1,2,4-triazolinedione, polyglycidyl 1,3-bis-(3-hydantoinyl)-2-hydroxypropane, as well as poly-(2-alkyl-glycidyl)-ethers, and, in particular, poly-(2-methyl-glycidyl)-ethers, of bisphenols and polyvalent phenols, such as bis-(2-methylglycidyl)-ether of bisphenol A.

Useable polyepoxides are also those which can be obtained e.g., by means of the reaction of a diepoxide with a bisphenol, in a mutual molar ratio of said diepoxide to said bisphenol high than 1 and non higher than 2, and the values of average molecular weight and of epoxy equivalent weight of which increase with decreasing values, within the range of from 2 to 1, of said ratio of the number of diepoxide moles to the number of bisphenol moles charged to the reaction. Such a type of diepoxides comprise the "higher homologous compounds" of bisphenol A diglycidylether having the following chemical structure:

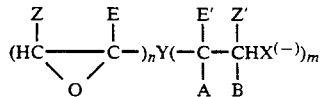

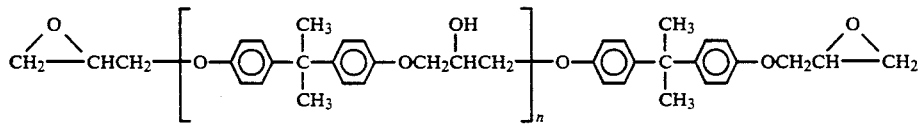

and several mixtures thereof, offered on the market with an average value of "n" comprised within the range of from about 0.2 to about 30, as well as the corresponding "higher homologous" diepoxides of bisphenol F diglycidylether.

Other polyepoxides which can be used are the polyglycidylethers of such polyols as 1,4-butanediol, 1,6-hexanediol, neopentylglycol, 1,4-dimethylolcyclohexane, 2,2-bis(4-hydroxycyclohexyl)-propane (also said "hydrogenated bisphenol A"), polypropyleneglycol, glycerol, 1,1,1-trimethylolpropane, pentaerythritol, caster oil.

Those polyepoxides can be used as well, which can be obtained by the polyepoxidation, e.g., by means of peracids, of compounds containing 2 or more double bonds of olefinic character such as butadiene, 1,5-cyclooctadiene, 1,5,9-cyclododecatriene, dicyclopentadiene, 3-vinyl-cyclohexene, divinylbenzene, 4,4'-diallyl-diphenylether, 2,2-bis-(4-allylcyclohexyl)-propane, polyunsaturated olefins containing 2 or more cyclohexenic or cyclopentenic rings bonded by single or multiple atom bridges, such as bis-(2-cyclopentenyl)-ether, 2-(3-cyclohexenyl)-5,5-spiro-cyclohex-3-ene-metadioxane, 3-cyclohexenylmethyl-3-cyclohexenoate, bis-(3-cyclohexenylmethyl)-adipate, esters of polyols with unsaturated carboxy acids, such as a large number of vegetable oils, polymers and copolymers containing double bonds of olefinic character, such as polybutadiene, polyisoprene and their copolymers with other vinylic monomers, such as styrene, as well as unsaturated polyesters. Also epoxy-groups-containing polymers can be used, which can be obtained from such vinyl-glycidyl monomers as glycidyl acrylate, glycidyl methacrylate, allylglycidylether and copolymers thereof with such other vinylic monomers as styrene, alpha-methylstyrene, vinyl acetate, alkyl acrylates and alkyl methacrylates.

According to the instant finding, also monoepoxides can be used, and preferably those which are liquid at room temperature, and in mixture with polyepoxides of the hereinabove cited types. Said monoepoxides contain the glycidylethers of such alcohols as butanol, heptanol, octanol, 2-ethyl-hexanol, allyl alcohol, as well as the glycidylethers of such phenols as phenol, paracresol, para-tert.-butylphenol, nonylphenol.

The suitable (C) liquid catalyst according to the present invention is a composition constituted by, or comprising, at least one compound containing epoxy group(s) and quaternary ammonium halide group(s) and having the general chemical formula or, and more commonly, can be constituted by a mixture of several different compounds, i.e., a mixture whose average chemical composition can be represented by means of the same formula.

In said formula:

A and B which are different from each other, are —OH or an —NR$_1$R$_2$R$_3$ group;

n has an average value either equal to, or higher than, 1, and is preferably comprised within the range of from 1 to 3;

m has an average value either equal to, or higher than, 1, and preferably equal to 1;

the "n" epoxy groups can have a same chemical structure, or they have different chemical structures;

the "m" quaternary-ammonium groups can be of one type only, or of different types;

Y is an organic radical of aliphatic, cycloaliphatic, aromatic, heterocyclic, or mixed, character and can optionally contain heteroatoms not belonging to cyclic structures and/or functional or bonding groups containing, or not containing, heteroatoms, such as ether, thioether, ester, alcoholic hydroxy, double bond of olefinic character and still others;

E and E' which can be either equal to, or different from, each other, preferably are hydrogen atoms, but can also be either aliphatic or cycloaliphatic radicals;

Z and Z' which can be either equal to, or different from, each other, can be hydrogen, or aliphatic, cycloaliphatic, aromatic, heterocyclic radicals or radicals of mixed character, or, optionally, they can be replaced by simple chemical bonds with this same Y radical;

R$_1$, R$_2$ and R$_3$ which can be either equal to, or different from, one another, can be radicals of aliphatic, cycloaliphatic, aromatic, heterocyclic, or mixed character and can optionally contain several functional or bonding groups such as ether, thioether, ester, amide, alcoholic hydroxy, and still others;

R$_2$ and R$_3$ can optionally constitute a part of a heterocyclic structure including the quaternary nitrogen atom;

$X^{(-)}$ is the anion of a halogen selected from among chlorine, bromine or iodine, and preferably is iodine.

According to the present invention, said "C" catalyst is preferably, but not exclusively, prepared by reacting a polyepoxide, or a mixture of several polyepoxides, with a suitable amount of a secondary monoaminic compound having the formula

R$_2$R$_3$NH or a mixture of several secondary, monoaminic compounds of said type, and successive quaternization of the tertiary β-hydroxy-aminic groups produced by the reaction of addition which takes place between equimolecular amounts of epoxy group and of aminic compound

R$_2$R$_3$NH with an alkyl halide

R$_1$X or a mixture of different alkyl halides.

In order to prepare such a catalyst, the same polyepoxides can be suitably used, which have been cited hereinabove as the constituents of the (B) component, and among them those polyepoxides are preferably and advantageously used, which are liquid at a temperature lower than 60° C., and preferably those which are liquid and low-viscous at temperatures lower than 20° C. Such a type of polyepoxides are preferably selected from among the group of polyglycidylethers of such poliols as 1,4-butanediol, 1,6-hexanediol, trimethyl-1,6-hexanediols, neopentylglycol, 1,4-dimethylolcyclohexane, diethyleneglycol, triethyleneglycol, dipropyleneglycol, polyethyleneglycol, polypropyleneglycol, glycerol, 1,1,1-trimethylolpropane, 1.1.1-trimethylolethane, castor oil.

Other polyepoxides which can be advantageously used comprise products which can be obtained by means of the epoxidation of compounds containing 2 or more double bonds of olefinic character, such as 3-vinylcyclohexene dioxide, 3,4-epoxycyclohexylmethyl-3,4-epoxycyclohexane carboxylate, bis-(3,4-epoxycyclohexyl) adipate.

Also advantageously useable are suitable mixtures, liquid and preferably low-viscous at a temperature lower than 20° C., of different polyepoxides.

The polyepoxide or the suitable mixture of different polyepoxides are reacted with a compound containing a secondary aminic group

R$_2$R$_3$NH or with a mixture of different compounds of said type, in which R$_2$ and R$_3$ can optionally make a part of a ring including the nitrogen atom of the NH group, and having an aliphatic, cycloaliphatic, aromatic, heterocyclic or mixed chemical structure and optiomally also containing heteroatoms not belonging to cyclic structures and/or functional or bonding groups containing, or not containing, heteroatoms, such as, e.g., ether groups, thioether groups, alcoholic hydroxy groups. Said secondary monoaminic compound is preferably liquid at temperatures lower than 20° C., and is preferably selected from among the group consisting of the amines and secondary aliphatic, cycloaliphatic, araliphatic and mixed aminoethers, from the group consisting of the secondary alkanolamines and of the alkanolaminoethers with a secondary aminogroup, as well as from the group of imines and iminoethers. Such a type of aminic compounds, which can be advantageously used, comprise diethylamine, dipropylamine, dibutylamine, diisobutylamine, dihexylamine, di-2-ethylhexylamine, N-methyl-butylamine, N-ethyl-propylamine, N-methylcyclohexylamine, N-ethyl-cyclohexylamine, N-ethylbenzylamine, di-(2-methoxyethyl)-amine, diethanolamine, N-methyl-ethanolamine, N-butyl-ethanolamine, bis-[2-(2-hydroxyethoxy)-ethyl]-amine, pyrrolidine, piperidine, 4-methyl-piperidine, morpholine and mixtures thereof. The amount of polyepoxide and of secondary monoaminic compound charged to the reaction in order to prepare the catalyst are such that the ratio of the epoxy groups to the NH groups is higher than 1, and is preferably comprised within the range of from 2 to 5. In particular, for said epoxide/NH ratio a value of "x" is preferably used, wherein "x" is equal to the number of epoxy groups contained in the polyepoxide used in order to prepare the same catalyst.

The tertiary aminic groups obtained by means of the reaction between the epoxy groups and NH groups are subsequently converted into quaternary ammonium groups by reacting the above product obtained by reacting the polyepoxide and the secondary monoaminic compound, with an amount of an alkyl monohalide

R$_1$X or with a mixture of different alkyl monohalides, which is stoichiometrically equivalent to, or larger than, the amount of the secondary monoaminic compound used and, in particular, such that the molar ratio of the alkyl monohalide to the secondary monoaminic compound is preferably comprised within the range of from 1.0 to 1.1.

Said alkyl monohalide is selected from the group consisting of aliphatic, cycloaliphatic, araliphatic, heterocyclic or mixed alkyl monochlorides, monobromides and monoiodides, and optionally also containing functional groups or bonding groups containing or not containing heteroatoms, such as, e.g., ether, ester, amide, epoxy, alcoholic hydroxy, double bond of olefinic character, triple bond of acetilenic character. According to the present invention, alkyl monoiodides of the above cited type are advantageously used.

Alkyl monoiodides which can be used comprise iodomethane, iodoethane, 1-iodopropane, 1-iodobutane, 1-iodopentane, 1-iodo-3-methyl-butane, 1-iodohexane, 1-iodoheptane, 1-iodooctane, 1-iodododecane, 1-iodohexadecane, 1-iodooctadecane, allyl iodide, iodoacetamide, ethyl iodoacetate, 2-iodoethanol, epiiodohydrin, and mixtures thereof.

The reaction between the polyepoxide and the secondary monoaminic compound, and the subsequent quaternization of the so produced tertiary aminic groups with the alkyl monohalide can be carried out either using the only concerned reactants, as hereinabove listed, or, preferably, with the aid of solvents known to those skilled in the art, which are non-reactive, or difficultly reactive with the chemical functionalities contained in the reaction mixture and which can be then easily removed by distillation. Solvents which can be advantageously used to prepare the catalyst comprise tetrahydrofuran, dioxane, 1,2-dimethoxyethane, diisopropylether, tert.-butyl-methyl-ether, hexane, heptane, cyclohexane, methylcyclohexane, benzene, toluene, nitromethane and mixtures thereof.

For illustrative purposes, a suitable exemplifying process, preferably adopted within the scope of the present invention in order to prepare the catalyst, can take place through the following main steps:

(a) The secondary monoaminic compound is gradually added, with stirring, to the proper polyepoxide, per se liquid, or turned into a liquid by dilution with a suitable solvent or solvent mixture, or, even better, dissolved in a suitable solvent or solvent mixture, previously charged to a reaction vessel preferably purged with an inert, dry gas and kept at a temperature preferably comprised within the range of from 40° to 150° C.

(b) When the addition of the aminic compound is complete, the reaction mixture is kept stirred at a temperature comprised with the same range, for a time period or from 0.5 to 8 hours.

(c) Still with stirring, the alkyl halide is added and the temperature of the reaction mixture is then kept at a value comprised within the same range as stated above, for a further time period of from 1 to 6 hours.

(d) The solvent, if used, and the possible unreacted alkyl halide are removed by atmospheric distillation, or by distillation under reduced pressure.

The so obtained catalyst is, at a temperature lower than 60° C., a more or less viscous liquid having a colour ranging from a pale yellow to an amber colour, according to its chemical structure, and is quickly and completely soluble in the "B" constituent of the reactive composition of the present invention if liquid, and in the mixture of (A) and (B), liquid at a temperature lower than 60° C.

The same catalyst can be then used as such, or diluted with a suitable amount of a liquid polyepoxide or monoepoxide, selected from among those hereinabove listed as the constituents of the "B" component of the reactive composition.

The possible diluent polyepoxide can be the same as used in order to prepare the same catalyst, and in such a case, the preparation of the catalyst can be carried out with particular advantage by directly reacting the whole amount of the polyepoxide with the secondary monoaminic compound and subsequently the alkyl monohalide as indicated hereinabove.

The (A) component, constituted by a polyisocyanate or by a mixture of different polyisocyanates, and the (B) component, constituted by one epoxide, or by a mixture of different epoxides, as hereinabove disclosed, are contained in the liquid reactive composition according to the present invention in variable amounts, but anyway in such amounts that the ratio of the isocyanate groups to the epoxy groups respectively borne by the same (A) and (B) components is comprised within the range of from 100:0 to 50:50 and preferably of from 95:5 to 55:45.

The amount of the "C" liquid catalyst in the reactive composition is such as to correspond to a range of from 0.01 to 10 parts by weight of iodine, bromine or chlorine, belonging to the quaternary ammonium halide moeities of the same catalyst, per each 100 parts by weight of (A)/(B) mixture of polyisocyanates and epoxides, and preferably comprised within the range of from 0.1 to 4.

The whole of the (A) and (B) components and of the (C) catalyst, in the suitable ratios to one another as hareinabove indicated, constitutes a reactive composition which is liquid at temperatures lower than 60° C. and preferably lower than 20° C., which, already when let standing at, or heated to, at a temperature comprised within the range of from of from 0° to 60° C., and still more rapidly when heated to higher temperatures, spontaneously and rapidly polymerizes and turns into a solid by means of a polymerization process promoted by the same (C) catalyst. Such a reactive mixture is destined to be used for the fast production of finished fabricated products, semifinished products, surface coatings, bonding agents or sealants constituted by a polymeric material having a high, or very high, softening temperature by means of a variety of continuous or batchwise processes well-known in the sector of the technologies of processing and applications of thermosetting resins and of the relevant composite materials, or by means of variants of said processes.

The gelling and subsequent hardening of the same reactive mixture can be caused to take place within a time which is the shorter, the higher the adopted working temperature and the larger the amount of (C) catalyst added to the same reactive mixture.

The reactive composition according to the instant finding can be constituted by the only reactive mixture of the (A) and (B) components and of the (C) catalyst, or it can be constituted by a blend of the same reactive mixture with optional (D) known additives or auxiliaries dispersed or dissolved in it.

Additives and auxiliaries, or associations of a plurality of them, the use of which is well-known to those skilled in the art of the plastic materials and of the thermosetting resins can be used as components of the reactive composition of the present invention in order to obtain from it a polymeric material endowed with particular and suitable characteristics, in order to better adapt the material to the operations which compose the used fabrication process, or in order to simply reduce the cost of the same material. Among such known additives, the following can be advantageously used, either alone or in association with one another: mineral fillers, such as, e.g., kaolin, talc, mica, calcium carbonate, dolomite, alumina, silica or glass powders; fiberglass, carbon, asbestos and still others, as short fibres or ground fibres; white powder pigments, such as titanium dioxide, zinc oxide, barium carbonate and barium sulfate and still others; black pigment, such as carbon black; coloured pigments; lubricating powders, such as graphite or molibdenum disulfide powders; inorganic flame retardants, such as antimonium trioxide, metal borates and phosphates; organic flame retardants, such as various polyhalogenated compounds, organic phosphates and phosphonates.

Additives and auxiliaries which can be used in association with the above listed ones and with one another, are also stabilizers, dyes, diluents, mould-release agents, agents endowing the reactive mixtures with thixotropic properties, antifoaming agents, propellants, blowing agents, surfactants, emulsifiers and still other agents whose use is known in the art.

The preparation of the liquid reactive composition according to the present invention can be carried out in different ways, according to the type of process selected in order to manufacture the finished fabricated articles, semifinished products, surface coatings, bonding agents or sealants with the same reactive composition, as well as according to the gelling and hardening speed which is typical, or desired, of the composition, i.e., of the planned speed of production of the same solid, polymeric fabricated articles, semifinished products, coatings, bonding agents or sealants.

The reactive composition according to the present invention is preferably and advantageously prepared by resorting to known procedures, by simultaneously and continuously mixing the (A) and (B) components and the (C) catalyst, forced to flow—in the suitable weight ratios to one another—and to finally merge all together, getting mixed with one another within an extremely short time interval, by flowing along a suitable duct, cavity, nozzle or the like, from which they are caused to continuously outflow and are then directly fed, as a liquid, homogeneous mixture, to the proper duct though which the same composition is injected, cast, spread or sprayed.

The composition can be prepared according to an at all analogous way by continuously mixing the (A) component with the (B)/(C) mixture previously prepared, or by continuously mixing the catalyst (C) with the previously prepared (A)/(B) mixture. The optional (D) additives and auxiliaries of the composition are preferably and advantageously homogeneously pre-dispersed in the (A) and (B) components, or in (B)/(C) or (A)/(B) mixtures.

It is also possible, in particular if batchwise and relatively slow processes, such as casting inside moulds, are adopted, prepare the reactive composition according to the present invention aliquot by aliquot, by mixing suitable amounts of all of the several components in a suitable container, and subsequently use the whole amount of composition prepared from time to time. Such a procedure can be applied with a reactive composition whose polymerization time is long enough and/or by adopting a mixing and handling temperature which is low enough, such as to enable the components to be perfectly homogenized and the liquid composition to be injected, cast, spread or sprayed before its gelling may take place.

When the mixing operation is finished, the reactive composition, let standing, or adjusted, at a temperature comprised within the range of from 0° to 60° C., or, optionally, at a higher temperature, is injected, sucked, cast, extruded, spread or sprayed—according to the process used—inside moulds, shaped hollows or on shaped cores or on several substrates, and then is let gel and harden. Said gelling/hardening process takes place spontaneously and rapidly.

In other terms, after being previously adjusted at a temperature comprised within the range of from 0° to 60° C., the composition spontaneously hardens, i.e., with no need of a further heat supply from the outside, turning into a solid, manageable polymeric material, within a time which is preferably comprised within the range of from a few minutes, up to some tens of minutes. Furthermore, such a hardening time can be considerably reduced by heating the same composition to temperatures higher than 60° C. and/or adopting particularly high concentrations of (C) catalyst, within the hereinabove specified concentration range.

According to the present invention, the solid polymeric material obtained by spontaneous and fast hardening from the reactive composition, and optionally containing mineral fillers, fibres and/or other known additives or auxiliaries, is then advantageously submitted, also separately, to a baking thermal treatment which causes its polymerization to proceed and possibly come to a completion, with the softening temperature, the stiffness and/or the tenacity, the hardness and the insolubility of the fabricated product being increased to very high values.

Such a treatment of baking of the already hardened reactive composition can be carried out by keeping the material at a temperature comprised within the range of from 50° to 300° C., and preferably comprised within the range of from 150° to 250° C., for a time comprised within the range of from 0.5 to 24 hours, and preferably comprised within the range of from 0.5 to 6 hours.

By means of the suitable thermal baking treatment, the polymeric material which can be obtained from the reactive composition according to the present invention can reach softening temperature values higher than 250° C. and generally comprised within the range of from 150° to 300° C., as well as considerably high values of hardness, of elastic modulus, and a complete, or nearly complete, insolubility. Further characteristics of the polymeric material which can be obtained from the composition according to the instant finding, and even in the absence of additives or auxiliaries, are a low inflammability, and a good fire-retardant behaviour, as well as high values of adhesiveness to many substrates, such as metals, glass and ceramic materials.

The liquid reactive composition according to the present invention can also be advantageously used for the fast production of finished fabricated articles or of semifinished products of composite polymeric material, with a high heat distorsion temperature and reinforced with long and/or continuous, stiff and/or high-strength fibres, such as fiberglass, carbon fibres, polyaramidic fibres, silicon carbide fibres, boron fibres, ceramic fibres, metal fibres, of with other known fibres or associations thereof, and/or with various metal or non-metal reinforcer structures and inserts, as well as for fast encapsulation or embedding of several kinds of objects such as, e.g., electrical, electronic circuits or devices, or the like. Continuous bundles, bands, mats, fabrics, nonwoven fabrics, shaped cores or other aggregates of fibres or associations thereof, as well as several reinforcer structures or inserts of metal or of other materials, or still various objects with several shapes and sizes, can be wetted and impregnated with the liquid reactive composition and embedded inside it. The same reactive composition is then let rapidly harden and is subsequently submitted to the thermal baking treatment, according to as reported hereinabove.

The composition according to the present invention can be used, and is particularly suitable, for manufacturing finished fabricated articles of also considerable dimensions and/or high thicknesses by means of such known processes as Resin Transfer Moulding, High Speed Resin Transfer Moulding, Liquid Injection Moulding, Reaction Injection Moulding and the like, or by means of variants thereof.

In said processes, the liquid reactive composition, preferably let standing or previously adjusted at a temperature comprised within the range of from 0° to 60° C., is rapidly injected or sucked into a closed mould, preferably adjusted at a temperature comprised within the same range, is allowed to polymerize and spontaneously harden inside said mould, with no heat having to be supplied from the outside, within a very short time period, anyway not longer than a few tens of minutes, and then within a equally short time is extracted from the same mould as a solid fabricated article.

Inside said fabrication mould, mats, fabrics, nonwoven fabrics, pre-shape cores or other aggregates of various reinforcer fibres and/or structures or inserts of metal or of other materials can be previously arranged, which are impregnated and embedded by the liquid reactive composition during the injection thereof, and after polymerization form with it a fabricated reinforced composite of polymeric material.

The composition according to the present finding is also suitable, in association with fibres or various reinforcer structures as above mentioned, or without any of them, for the fast production of finished fabricated articles or of semifinished products of polymeric material by means of other batchwise processes known in the field of the thermosetting resins. In other terms, the reactive composition can be, e.g., cast under atmospheric pressure or under vacuum inside opened shaped hollows or moulds, or it can be spread or sprayed onto shaped cores, or still can be charged to a mould and forced, inside it, to take the shape thereof by a countermould, or can be charged inside a shaped hollow, being then forced to take the shape thereof by means of an elastic membrane, or anyway a deformable membrane urged to return back by means of an air suction, and/or pushed by compressed gas, and then said reactive composition can be let polymerize and harden under such conditions, at the low temperatures and within the short times as indicated above.

The composition according to the present finding can be also used for manufacturing, by means of a fast process and in continuous mode, such semifinished articles as section bars, tubes, rods, plates, boards and the like, containing, or not containing long or continuous reiforcer fibres, or various kinds of inserts.

The liquid reactive composition, prepared by means of the continuous on-line mixing of its components, can be extruded or cast, in continuous mode, together with, or without, continuous tapes, bands, fabrics, non-woven fabrics, and the like, made from fibres, through variously shaped nozzles, and then let rapidly polymerize and harden along the same processing line.

The composition according to the present invention is furthermore suitable for being used for fast coating or painting, e.g., for protective or decorative purposes, the surfaces of various articles, as well as for fast bonding parts of articles, or still for rapidly sealing junctures, joints or interstices between different parts of articles. The liquid reactive composition can be prepared aliquot by aliquot, or preferably by continuous mixing its components on-line, and then can be practically immediately spread, sprayed or injected onto the surfaces, junctures, joints or interstices to be treated, and then let rapidly harden. In particular when it is used as a coating or a paint, the reactive composition can comprise known diluents or solvents which reduce its viscosity, and, in particular, which can be subsequently removed by evaporation at suitable, more or less high temperatures.

The reactive composition, the characteristics thereof, and the relevant processes of preparation and use of the present invention are better evidenced in the following examples of practical embodiment thereof, which are given for merely indicative purposes, and in no way should be construed as being limitative of the same invention.

EXAMPLE 1

184.5 g of 1,6-diglycidoxyhexane and 225 g of tetrahydrofuran are charged to a 5-necked glass flask of 1 liter of capacity equipped with a mechanical stirrer, a thermometer, a reflux condenser, a charging funnel and a tube fitting for feeding dry nitrogen, which is caused to slowly flow through te reaction flask during the whole process which is subsequently carried out. This solution is heated to a temperature of 80°-85° C., and while it is being kept at this temperature, 120.0 g of dibutylamine is added dropwise to it, with strong stirring, within a 30-minutes time.

The reaction mixture is then maintained with stirring at 80°-85° C. for a further 4 hours, then 148.5 g of iodoethane is subsequently added to it. The so obtained mixture is kept at the same temperature for a further 4 hours, and then is cooled. From the so obtained solution, charged to a rotary evaporator, tetrahydrofuran and the small amount of unreacted iodoethane are removed by distillation under reduced pressure, and at a temperature of from 50° to 70° C.

The so prepared catalyst is, at 15°-25° C., a high-viscosity liquid of light yellow colour, and with a honey-like consistency.

A liquid reactive composition is prepared by rapidly mixing at about 23° C.:

192.0 g of "crude" MDI polyisocyanate having a content of isocyanate groups (as determined by titration with dibutylamine) of 31.05% by weight, an isocyanate equivalent weight of 135.32, and a viscosity of 135 cPs at 23° C.;

48.0 g of an epoxy resin having a chemical structure close to the structure of the glycidylether of bisphenol A, an epoxy equivalent weight (as determined by titration with hydrobromic acid according to known methods) of 184.8 and a viscosity of 9250 cPs at 23° C.;

10.3 g of the catalyst prepared as disclosed above.

The viscosity of the so prepared reactive composition is of about 240 cPs at the same temperature of 23° C.

Four portions, of 40 g each, of the so prepared liquid reactive composition are rapidly cast inside four aluminum, flat-bottom rectangular containers of $100 \times 100 \times 30$ mm placed in a perfectly horizontal position on the plate of a laboratory oven at the controlled temperature of 50° C., and one of them is left, also in a perfectly horizontal position, in an environment at the temperature of 23° C. The reactive composition inside the containers kept at the temperature of 50° C. spontaneously polymerizes and hardens within about 7 minutes, turning into a transparent, glass-like, amber-coloured solid material, which can be removed from the mould as a flat slab, which is relatively brittle, but manageable.

The composition inside the container kept at 23° C. undergoes gelling approximately 30 minutes later than its preparation.

Two containers with the composition hardened at 50° C. as above disclosed are maintained in an oven at 180° C. for one hour, with two flat, rectangular slabs of hard, rigid, high-strength polymeric material being obtained, whose glass transition temperature, determined by differential calorimetry at a scanning speed of 10° C./minute, is of about 230° C.

One of these slabs is further baked for 1 hour at 230° C. and is subsequently cut in order to produce small rectangular rods, with which a softening temperature of about 280° C. (this "softening temperature" is defined as the temperature at which the value of tan $\delta$—as measured by means of dynamic-mechanical analysis performed according to the bending method on three points and at an operating frequency of 1 Hz with a Dyanastat dynamic-mechanical analyser—begins to increase); and an elastic bending modulus at 23° C.—as determined by means of the dynamometer according to ASTM D 790 standard—of of the dynamometer according to ASTM D 790 standard—of 3.7 GPa, are determined for the material.

EXAMPLE 2

The liquid reactive composition of Example 1 is used in order to prepare a fiberglass-reonforced polymeric composite by means of a closed-mould injection process and fast "in situ" polymerization.

To two steel tanks equipped with mechanical stirring means, purged with dry nitrogen, respectively kept at the controlled temperatures of 25° and 50° C. and connected with a machine for thermosetting resins injection "Venus EP 03", the following materials are respectively charged:
1. To the tank at 25° C.: the same "crude" MDI as of Example 1;
2. To the tank at the controlled temperature of 50° C.: a mixture of the same diepoxide and of the same catalyst as of Example 1, in the ratio of 4.65:1, by weight, to each other. This mixture has a viscosity of 434 cPs at 50° C.

Four layers of a cut-fibre fibreglass mat of 450 g/m² are arranged inside a mould of aluminum, with an inner rectangular hollow of 300×300×6.4 mm, equipped with diathermic oil heating/cooling coils—with oil being caused to circulate by means of a suitable oil circulation unit—and installed between the platens of a hydraulic press.

The liquid reactive composition is injected into the mould, pre-heated at 50° C., by means of the mixing/injection "gun" of the machine. The "gun" is equipped with a static tubular mixer fed, under a pressure of 4 bars, with two streams pumped from the respective tanks with a mutual volumetric flow ratio of 3.13:1, respectively of the "crude" MDI and of the diepoxide/-catalyst mixture.

According to a determination carried out separately, the mixture of "crude" MDI and of said diepoxide in the mutual ratio of 4:1 by weight, has a viscosity of 43 cPs at 50° C.

The mould is filled within a time of approximately 10 seconds. 15 minutes after the injection, the mould is opened and a solid slab of composite polymeric material is extracted from it. Said slab is baked in an oven at 180° C. for 1 hour, and then at 230° C. for 2 hours.

The slab is subsequently cut into small rectangular rods which are used for the determination of the characteristics of the obtained material:
(a) fiberglass content, by weighing some bars before and after them being burnt in a muffle at 600° C.; 19.4% by weight;
(b) softening temperature, by dynamic-mechanical analysis in the same way as described in Example 1; about 275° C.;
(c) elastic modulus under bending stress at 23° C., according to ASTM D 790; 5.6 GPa;
(d) ultimate bending stress at 23° C., according to the same standard; 195 MPa.

EXAMPLE 3

A liquid catalyst is prepared by reacting, according to the same modalities as of Example 1, 200.0 g of polypropyleneglycol-diglycidylether having an epoxy equivalent weight of 182.3; 200 g of a 50:50 (by volume) tetrahydrofuran/cyclohexane solvent mixture; 140.0 g of dibutylamine; 173.0 g of iodoethane; and then distilling off the solvent mixture and the small amount of unreacted iodoethane.

A reactive compostion is prepared by rapidly mixing, in a container kept at the temperature of 20°-25° C., 280 g of the same "crude" MDI used in the two preceding examples, 33 g of the same diepoxide-diglycidylether of bisphenol A used in Example 1, and 16.5 of the above disclosed liquid catalyst. As soon as it is prepared, the composition, having a viscosity of 220 cPs at 23° C., is rapidly cast inside a vertical, flat mould of aluminum with an inner rectangular hollow of 250×250×4.5 mm, kept at the temperature of 50° C. inside a laboratory oven.

10 g of the same reactive composition, cast inside a small cylindrical capsule of 50 mm of diameter and let standing inside a chamber at the temperature of 23° C., spontaneously turn into a gel within a time of about 40 minutes.

After 15 minutes at 50° C., the temperature of the oven which contains the mould is increased by means of a 30-minutes ramp up to 180° C., and is subsequently kept at that value for 45 minutes. The mould is removed from the oven, is cooled and opened. A flat, transparent, dark-amber-coloured plate is extracted from it. From said plate a strip is cut, which shows a value of glass transition temperature, determined by differential calorimetry, of about 190° C.

The same plate is then submitted to a baking in an oven at 200° C. for 4 hours.

Rectangular bars cut from the plate which has undergone such a thermal treatment show a softening temperature, as determined by means of the dynamic-mechanical analysis carried out a in Example 1, of about 295° C.; a Vicat softening point higher than 250° C.; and an elastic bending modulus at 23° C. of 4.2 GPa.

EXAMPLE 4

To the two tanks connected with an injection machine for thermosetting resins "Venus HIS 80–400/S.M.", both kept at the controlled temperature of 50° C., the following reactants are respectively charged:
1. a mixture in the mutual ratio of 2.27:1 by weight of: a "crude" MDI containing 31.50% by weight of isocyanate groups, having an isocyanate equivalent weight of 133.40 and a viscosity at 23° C.°C. of 42 cPs; and a polyglycidyl derivative of a phenol/formaldehyde novolak with an epoxy equivalent weight, as determined by titration, of 193.5; which mixture has a viscosity of 35 cPs at the same temperature as of the controlled-temperature tank—i.e., 50° C.;
2. the catalyst prepared as in the preceding Example.

A liquid reactive composition is formed in the same way as disclosed in Example 2, by feeding the mixing-/injection "gun" of the machine with two streams, respectively of MDI/polyglycidyl-novolak and of catalyst, in the ratio of 49:1 by volume to each other.

The composition is directly injected into the same mould as described in Example 2, inside which three layers of fibreglass mat of 400 g/m² have been previously arranged, and pre-heated at the temperature of 50° C. The injection time is of 15 seconds.

After 10 minutes from the injection, a solid plate of composite material is removed from the mould and is baked in an oven: for 1 hour at 180° C., and then for a further 2 hours at 230° C.

Small bars obtained by cutting the plate are used in order to determine the characteristics of the very hard, rigid material obtained, which contains 14.2% by weight of fiberglass, and which has: a softening temperature—determined by dynamic-mechanical analysis as in Example 1—of about 305° C.; an elastic bending modulus at 23° C. of 7.2 GPa; an ultimate bending stress at 23° C. of 212 MPa.

The same reactive composition, injected as above reported into the same mould, without reinforcer fibres, yields a plate constituted by the only polymeric material which, after undergoing the same thermal treatment, has an elastic bending modulus at 23° C. of 4.5 GPa and the same softening temperature of about 305° C., as indicated hereinabove for the composite material.

EXAMPLE 5

A liquid, polyfunctional catalyst is prepared by reacting, according to the same process as reported in Example 1, 151.0 g of triglycidylether of 1,1,1-trimethylolpropane diluted with 180 g of tetrahydrofuran, 43.5 g of N-ethyl-propylamine and 99.0 g of 1-iodopentane and then distilling off tetrahydrofuran and any, small amounts of unreacted iodopentane.

To the two tanks connected with the resin injection machine described in Example 2, both maintained at the controlled temperature of 50° C. as in the preceding example, the following reactants are respectively charged:

1. a blend of "crude" MDI as used in Example 1, and of ground and calcined mica in the mutual ratio of 2.60:1 by weight. This liquid blend is kept stirred inside the tank throughout the subsequent operating steps of the fabricating process;
2. a mixture of the same polyglycidyl-novolak as used in the preceding Example, and of the above disclosed liquid, polifunctional catalyst, in the ratio of 10:1 by weight to each other.

By means of the mixing/injection "gun" of the machine, the reactive composition obtained by feeding and mixing two streams, respectively of MDI/mica blend and of polyglycidyl-novolak/catalyst mixture pumped from the two tanks in the ratio of 2.57:1 by volume to each other, is forced to fill the cylindrical hollows of thin-wall metal cylindrical moulds having an inner diameter of 50 mm and an inner height of 100 mm. The moulds are arranged in a vertical position, and are open at their top; the operating environment is at a temperature of about 22° C.

The hardening of the reactive composition takes place spontaneously inside the moulds within a time of about 10 minutes after the filling of said moulds, with spontaneous self-heating and with a maximum temperature of about 145° C. being reached at the centre of the cylinders.

15 minutes after mould filling, the solid cylinders of polymeric material formed from the liquid composition are extracted and charged to an oven at 180° C. After a stay time of 1 hour under said conditions, they are extracted from the oven and are let cool.

The so obtained cylindrical bodies can be machined on the lathe and the material which constitutes them has a glass transition temperature of about 295° C. A cylindrical body of machined material is submitted to a further baking treatment of 2 hours at 230° C., and then is allowed to cool. A disk prepared from the same material shows a Vicat softening point not lower than 315° C.

EXAMPLE 6

An isocyanate prepolymer liquid at room temperature is prepared by reacting 156.0 g of hydroxy-difunctional polypropyleneglycol, having an average molecular weight of 234, for 3 hours, at 80° C., with 340.0 g of diphenylmethane-4,4'-diisocyanate, inside a glass flask equipped with a stirrer and purged with dry nitrogen.

The so-prepared prepolymer contains 11.56% by weight of isocyanate groups, as determined by titration, and has an isocyanate equivalent weight of 363.4. A liquid catalyst is then prepared by reacting, as in Example 1, 182.3 g the same polypropyleneglycol-diglycidylether as used in Example 3, diluted with 150 g of a 50:50 mixture—by volume—of tetrahydrofuran and cyclohexane, 64.5 g of dibutylamine and 120.0 g of 1-iodooctane. After the solvent mixture being distilled off, a yellowish-coloured oil, viscous at 20°-25° C., is obtained, which is used later on as a catalyst.

A reactive composition is prepared by rapidly mixing the following components, inside a vessel at 20°-25° C.:
105 g of the above indicated isocyanate prepolymer;
105 g of the same "crude" MDI as used in Example 1;
129.5 g of bisphenol A-glycidylether having an epoxy equivalent weight of 178.8 and a viscosity of 9050 cPs at 23° C.;
10.50 g of the above indicated catalyst.

The liquid reactive composition is rapidly cast into the flat mould of Example 3, kept in the vertical position, and is preheated to 50° C. in an oven. 15 minutes later, the temperature of the oven inside which the mould is contained is increased up to 180° C. by means of temperature-increase ramp of about 20 minutes. The temperature of the oven is maintained 1 hour at said value of 180° C. After cooling, from the mould a plate of a rigid, hard polymeric material is discharged, which has a glass transition temperature of about 200° C., and can be subsequently submitted to a further thermal treatment.

EXAMPLE 7

To the two tanks connected with the resin-injection machine used in Example 2, and respectively kept at the controlled temperatures of 25° and 50° C., the following reactants are respectively charged:

1. a blend consisting of toluenediisocyanate (a mixture available from the market, consisting of toluene-2,4-diisocyanate and toluene-2,6-diisocyanate in the mutual ratio of 80:20), of the same "crude" MDI as used in Example 4, and of a calcined talc powder, in the mutual ratio of 1:1.3:2.22 by weight. Said blend is liquid and is maintained homogeneous by being continuously stirred inside the tank kept at the temperature of 25° C.;
2. a mixture of the same bisphenol A diglycidylether as used in the preceding Example, and of the catalyst prepared and used in Example 5, in the ratio of 30:1 by weight to each other.

The liquid blend consisting of toluenediisocyanate/MDI/talc and the liquid mixture consisting of diepoxide/catalyst respectively contained inside said two tanks are pumped in the ratio of 4.38:1 by volume to each other, to the gun of the injection machine and the liquid reactive composition is then injected into the same mould as of Example 2, kept pre-heated at the temperature of 50° C. The injection is carried out within a 10-seconds time and 15 minutes later the mould is opened and a plate of solid, polymeric material is discharged from it and is baked at 180° C. for 1 hour. The glass-like, hard material which constitutes the plate has a glass transition temperature, determined as in Example 1, of about 190° C.

The same plate is baked at 220° C. for a further 3 hours. The so further hardened polymeric material displays a softening point of about 260° C. according to a dynamic-mechanical determination carried out, as reported in Example 1, on small bars obtained by cutting the same plate.

EXAMPLE 8

A plate of composite, fiberglass-reinforced, flameproof polymeric material is obtained by rapidly using a suitable reactive composition, the resin-injection machine and the fabrication mould of Example 2.

To the two tanks connected with the same machine, both kept at the same controlled temperature of 40° C., the following reactants are respectively charged:

1. a blend of "crude" MDI with a content of 31.60% by weight of isocyanate groups, and a viscosity of 114 cPs at 23° C.; calcined talc powder; desiccated antimony trioxide ($Sb_2O_3$) powder, in the ratio of MDI:-talc:$Sb_3O_3$ of 11.85:4:1 by weight. The blend is kept continuously stirred inside the tank;
2. a mixture constituted by tetrabromobisphenol A-glycidylether with an epoxy equivalent weight of 325.5; para-tert.-butylphenylglycidylether; and the same catalyst as of Example 3, in the mutual ratio of 5.54:1.84:1 by weight.

A reactive composition is formed as disclosed in Example 2 by feeding the mixing/injection "gun" of the machine with two streams, at about 40° C., pumped from the relevant tanks, respectively of MDI/talc/$Sb_2O_3$ blend and diepoxide/p-tert.-butylphenylglycidylether/catalyst mixture in the mutual ratio of 5.35:1 by volume. The composition is injected within a 10-seconds time into the mould preheated at 50° C., and containing a layer of fibreglass mat of about 500 g/$m^2$.

A small aliquot, separately prepared, of the same composition hardens, inside an aluminum capsule kept standing inside an oven at 50° C., within a 6-minutes time.

10 minutes after the injection, a solid plate is discharged from the mould and is annealed at 180° C. for 1 hour. Owing to this treatment, it becomes stiff and hard. The polymeric material which constitutes it displays a glass transition temperature of about 235° C. Small bars cut from the plate—after an additional baking of the same plate for a further 3 hours at 180° C.—result to belong to the V-O flammability class according to the Underwriters' Laboratories UL94 testing procedure.

To the invention and to the relevant processes of use thereof as hereinabove disclosed and exemplified technically equivalent variant may be supplied, all of them falling within the scope of protection of the instant finding.

We claim:

1. Liquid composition, rapidly polymerizable by starting at a temperature lower than 60° C., comprising:
(A) at least one organic polyisocyanate;
(B) at least one organic compound containing at least one epoxy group and constituted by a monoepoxide or a polyepoxide or a mixture of different mono- and/or polyepoxides, or by an epoxy-group(s) containing compound selected from among the catalyst compounds (C);
(C) at least one catalyst which is liquid at temperatures lower than 60° C. and is comprised of at least one compound containing epoxy groups and quaternary ammonium halide groups and falling within the scope of the general formula

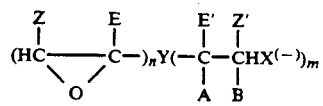

in which:

A and B which are different from each other, are —OH or an $^{(+)}NR_1R_2R_3$ group;

n is either equal to, or higher than, 1;

m is either equal to, or higher than, 1;

Y is a divalent organic radical deriving from aliphatic, cycloaliphatic, aromatic, heterocyclic, or mixed, compounds, which radical can optionally contain heteroatoms not belonging to cyclic structures and/or functional or bonding groups containing, or not containing, heteroatoms;

E and E' which can be either equal to, or different from, each other, are hydrogen or aliphatic or cycloaliphatic radicals;

Z and Z' which can be either equal to, or different from, each other, can be hydrogen, or organic radicals selected from among monovalent organic radicals as listed for Y, or can constitute a simple chemical bond with this same Y radical;

$R_1$, $R_2$ and $R_3$ which can be either equal to, or different from, one another, are organic radicals selected from among monovalent organic radical as listed for Y; and $R_2$ and $R_3$ can also constitute a heterocyclic structure including the quaternary nitrogen atom;

$X^{(-)}$ is the anion of a halogen selected from among chlorine, bromine or iodine.

2. Polymerizable liquid composition according to the claim 1, in which the halogen of (C) catalyst is iodine.

3. Polymerizable liquid composition according to claim 1, in which "n" has a value of from 1 to 3.

4. Polymerizable liquid composition according to claim 1, in which "m" has a value equal to 1.

5. Process for preparing a liquid catalyst which is liquid at temperatures lower than 60° C. and is comprised of at least one compound containing epoxy groups and quaternary ammonium halide groups and falling within the scope of the general formula

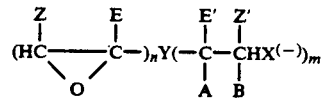

in which:

A and B which are different from each other, are —OH or an $^{(+)}NR_1R_2R_3$ group;

n is either equal to, or higher than, 1;

m is either equal to, or higher than, 1;

Y is a divalent organic radical deriving from aliphatic, cycloaliphatic, aromatic, heterocyclic, or mixed, compounds, which radical can optionally contain heteroatoms not belonging to cyclic structures and/or functional or bonding groups containing, or not containing, heteroatoms;

E and E' which can be either equal to, or different from, each other, are hydrogen or aliphatic or cycloaliphatic radicals;

Z and Z' which can be either equal to, or different from, each other, can be hydrogen, or organic radicals selected from among monovalent organic radicals as listed for Y, or can constitute a simple chemical bond with this same Y radical;

$R_1$, $R_2$ and $R_3$ which can be either equal to, or different from, one another, are organic radicals selected from among monovalent organic radical as listed for Y; and $R_2$ and $R_3$ can also constitute a heterocyclic structure including the quaternary nitrogen atom;

$Z^{(-)}$ is the anion of a halogen selected from among chlorine, bromine or iodine which process consists of reacting at least one compound containing at least two epoxy groups with a compound $$R_2R_3NH$$

containing a secondary aminic group, or a mixture of said compounds, and subsequently reacting the so obtained reaction product with an alkyl halide $$R_1X$$

or a mixture of alkyl halides.

6. Process for prepararing the (C) liquid catalyst according to the claim 5, in which a polyepoxy is used which is liquid at a temperature lower than 60° C.

7. Process for preparing the (C) liquid catalyst according to claim 5, in which the epoxy compound and the secondary aminic compound are reacted with a ratio of the epoxy groups to the NH groups which is higher than 1.

8. Process for preparing the (C) liquid catalyst according to the claim 7, in which the ratio of the epoxy groups to the NH groups in the compounds charged to the reaction is within the range of from 2 to 5.

9. Polymerizable liquid composition according to claim 1, in which the ratio of the isocyanate groups to the epoxy groups of the (A) and (B) components is within the range of from 100:0 to 50:50

10. Polymerizable liquid composition according to the claim 1, in which the ratio of the isocyanate groups to the epoxy groups of the (A) and (B) components is within the range of from 95:5 to 55:45.

11. Polymerizable liquid composition according to claim 1, in which at least one of the two (A) and (B) components, and the mixture thereof, are liquid at a temperature lower than 60° C.

12. Polymerizable liquid composition according to claim 1, in which the (A) component is an aromatic polyisocyanate or a mixture of aromatic polyisocyanates.

13. Polymerizable liquid composition according to claim 1, in which the amount of the (C) liquid catalyst is within the range of from 0.01 to 10 parts by weight of halogen per 100 parts by weight of (A)/(B) mixture.

14. Polymerizable liquid composition according to the claim 13, in which the amount of the liquid catalyst is comprised within the range of from 0.1 to 4 parts by weight of halogen per 100 parts by weight of (A)/(B) mixture.

15. Polymerizable liquid composition according to claim 1, further comprising a component (D) which is selected from among the group consistig of mineral fillers, short or ground fibres, pigments, diluents, stabilizers, flame-retardant agents, lubricants, mould-release agents, antifoaming agents, propellants, blowing agents, surfactants, wetting agents, or combinations or two or more thereof.

* * * * *